Oct. 23, 1956  A. J. W. M. VAN OVERBEEK  2,768,294
CIRCUIT FOR GENERATING SAWTOOTH OSCILLATIONS
Filed Oct. 6, 1953
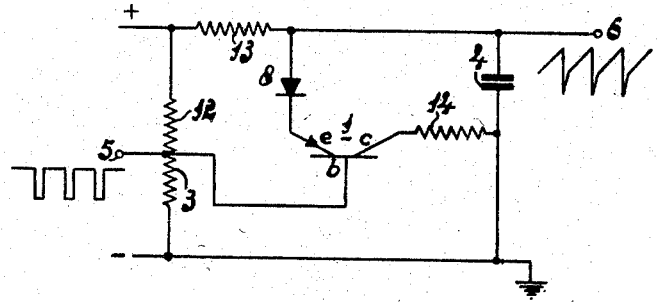
INVENTOR
ADRIANUS JOHANNES WILHELMUS
MARIE VAN OVERBEEK
BY
AGENT United States Patent Office 2,768,294
Patented Oct. 23, 1956

2,768,294

CIRCUIT FOR GENERATING SAWTOOTH OSCILLATIONS

Adrianus Johannes Wilhelmus Marie van Overbeek, Eindhoven, Netherlands, assignor to Hartford National Bank and Trust Company, Hartford, Conn., as trustee Application October 6, 1953, Serial No. 384,499

Claims priority, application Netherlands October 8, 1952

3 Claims. (Cl. 250—36)

The present invention concerns circuits for generating sawtooth oscillations. More particularly, the invention relates to a circuit for generating sawtooth oscillations with the use of a transistor in generator connection, which has a synchronizing oscillation supplied to it and in which sawtooth oscillations are generated by way of a capacitor included in the collector circuit of the transistor. The object of the invention is to provide a synchronized sawtooth generator suited for low synchronization frequencies; for example for generating the frame sawtooth-oscillation in a television receiver.

It appears that a circuit of the above-mentioned kind causes difficulties when a low synchronization frequency is used. The invention is based on recognition of the fact that said difficulties are, on the one hand, attributable to the fact that the condenser in the collector circuit must not be given an unduly high value, since otherwise excessive heat-development in the transistor is involved, and that they are on the other hand, a result of the fact that in existing transistors the inner resistance between the emitter electrode and the base electrode, measured in the cut-off direction, is normally too low.

According to the invention, in order to obviate said difficulties and to decrease the natural frequency of the transistor generator, a rectifier having a direction of passage corresponding to that of the emitter electrode is included in series in the circuit connecting the emitter electrode of the transistor through the said capacitor to its collector electrode.

In order that the invention may be readily carried into effect, it will now be described with reference to the accompanying drawing, wherein the figure is a schematic diagram of an embodiment of the sawtooth generator circuit of the present invention.

In the figure is a transistor 1, which may comprise, for example, an A-transistor of the N-type, of which an emitter electrode $e$, a collector electrode $c$ and a base electrode $b$ are connected by way of suitably proportioned impedances to the positive and negative terminals of a voltage source, so that sawtooth oscillations are generated in a known manner. For this purpose, the base circuit more particularly includes a comparatively high impedance 3 and the collector circuit includes a capacitor 4 across which the sawtooth oscillations are generated. The frequency of the sawtooth oscillations is synchronized with an outer synchronizing oscillation, supplied by way of a terminal 5, to the base electrode $b$ of the transistor.

The operation of the circuit is as follows.

Starting from the moment at which the base electrode $b$ becomes negative with respect to the emitter electrode $e$ as a result of the synchronizing oscillation at the terminal 5, a current flows from the emitter electrode $e$ to the base electrode $b$ and a somewhat greater current (in case of an A-transistor) flows from the base electrode $b$ to the collector electrode $c$. Consequently, the current flowing to the base electrode $b$ produces a voltage drop across the resistor 3, which is in phase with the synchronizing oscillation, so that the voltage of the base electrode $b$ suddenly decreases to a voltage approximately equal to that of the collector electrode $c$. At this moment the current flowing from the base electrode $b$ to the collector electrode $c$ is smaller than the current flowing from the emitter electrode $e$ to the base electrode $b$, so that the voltage drop of the base current occurring across the resistor 3 becomes in phase opposition to the synchronizing oscillation.

The current flowing to the collector electrode $c$ during this time causes a similar sudden voltage drop at the upper electrode of capacitor 4 which is connected to an output terminal 6. After the voltage drop has ceased, the capacitor 4 discharges in a sawtooth-shaped manner. The discharge time-constant and hence the natural frequency of the sawtooth oscillation, according to the principle underlying the invention is substantially determined by the product of the capacitance value of capacitor 4 and the inner resistance of the transistor 1 between the collector electrode $c$ and the emitter electrode $e$, measured in the cut-off direction of said emitter electrode.

If the capacitor 4 were given a capacitance value which is unduly high, the heat-development in the transistor would become undesirably large. According to the invention, for this purpose the inner resistance of transistor 1 is apparently increased by a rectifier 8 having a direction of passage corresponding to that of the emitter electrode $e$. The rectifier 8 is included in the series-circuit connecting the emitter electrode $e$ by way of capacitor 4 to the collector electrode $c$, so that the said inner resistance is apparently increased by the inner resistance of said rectifier, measured in the cut-off direction.

In one advantageous embodiment, the resistor 3 may have a value of 27 kilohms, the resistor 12 may have a value of 82 kilohms, the resistor 13 may have a value of 1.8 megohms, the resistor 14 may have a value of 500 ohms and the capacitor 4 may have a value of 0.1 microfarads, and the rectifier may be of the OA55 type.

It is to be understood that the invention is not limited to the details disclosed but includes all such variations and modifications as fall within the spirit of the invention and the scope of the appended claims.

What is claimed is:

1. In a synchronized sawtooth generator provided with a transistor having an emitter electrode, a collector electrode and an emitter-collector path, means coupled to said transistor for producing sustained oscillations comprising a capacitor, a series circuit arrangement comprising a rectifier connected in series with said emitter-collector path, said series circuit arrangement being connected across said capacitor, said rectifier having a direction of passage corresponding to that of said emitter electrode, and means for deriving sawtooth oscillations from said generator.

2. In a sawtooth generator provided with a transistor having an emitter, a collector and a base electrode, the combination comprising means for applying a synchronizing oscillation to said base electrode, a capacitor, a series circuit connected across said capacitor, said circuit including said emitter and collector and a rectifier having a direction of passage corresponding to that of said emitter electrode, and an output terminal coupled to said capacitor for deriving sawtooth oscillations therefrom.

3. A sawtooth generator having a low natural frequency comprising a transistor having an emitter, a collector and a base electrode, a first resistor having a tap thereon connected between a positive potential terminal and ground, means for applying a synchronizing oscillation to said base electrode through said tap, a second resistor connected at one end to said terminal, a capacitor connected between the other end of said second resistor and ground, a third resistor connected between said collector electrode and ground, a rectifier connecting said emitter electrode to said collector electrode through said capacitor, said rectifier having a direction of passage corresponding to that of said emitter electrode, and an output terminal connected to said capacitor for deriving sawtooth oscillations therefrom.

References Cited in the file of this patent
UNITED STATES PATENTS

| | | |
|---|---|---|
| 2,629,834 | Trent | Feb. 24, 1953 |
| 2,663,800 | Herzog | Dec. 22, 1953 |